G. W. WALLACE.
GAME APPARATUS.
APPLICATION FILED JUNE 21, 1909.

1,040,064.

Patented Oct. 1, 1912.

2 SHEETS—SHEET 1.

WITNESSES:

INVENTOR
GEORGE W. WALLACE
BY
HIS ATTORNEY.

G. W. WALLACE.
GAME APPARATUS.
APPLICATION FILED JUNE 21, 1909.

1,040,064.

Patented Oct. 1, 1912.

2 SHEETS—SHEET 2.

WITNESSES:

INVENTOR
GEORGE W. WALLACE
BY
HIS ATTORNEY.

UNITED STATES PATENT OFFICE.

GEORGE W. WALLACE, OF SANTA CRUZ, CALIFORNIA.

GAME APPARATUS.

1,040,064.   Specification of Letters Patent.   Patented Oct. 1, 1912.

Application filed June 21, 1909. Serial No. 503,535.

*To all whom it may concern:*

Be it known that I, GEORGE W. WALLACE, citizen of the United States, residing at Santa Cruz, in the county of Santa Cruz and State of California, have invented new and useful Improvements in Game Apparatus, of which the following is a specification.

My invention relates to a game which I term a battle game or "The game of Gettysburg."

It consists in a field or map in which the general topography of the battlefield of Gettysburg is indicated, and in movable pieces indicating generals and brigades or other bodies of artillery, infantry, cavalry, and red cross corps, which may be moved on the said map or field, under certain conditions to represent the battle of Gettysburg. This field or map is surrounded by lines representing a circular railway, A, and contains lines representing a rectangular railway, 2, inscribed within the circular railway, inclosing a square. The said square is subdivided into four equal squares by lines representing a railway in the form of a Greek cross, or the sign plus. All the said railways are indicated by double or parallel lines. The space within the bounds of the rectangular railway is further subdivided by a system of intersecting circles and curved lines and also by straight lines crossing each other at right angles and parallel with the lines of the rectangular railway, and by other dotted straight lines, parallel with the lines of the rectangular railway, to indicate the boundaries of the corps and divisions of both armies, and by other straight lines crossing the square inclosed by the rectangular railway, diagonally to the first-named straight lines, as shown at 15 in Figure 1. Stations are also shown on the said battle map for the locations of the commanders-in-chief, the commanders of corps and divisions, and the commanders of reserves, and other stations for the location of pieces representing the bodies engaged in the battle, and stations for the red cross corps.

It also comprises details of construction which will be more fully explained by reference to the accompanying drawings, in which—

Figure 1:
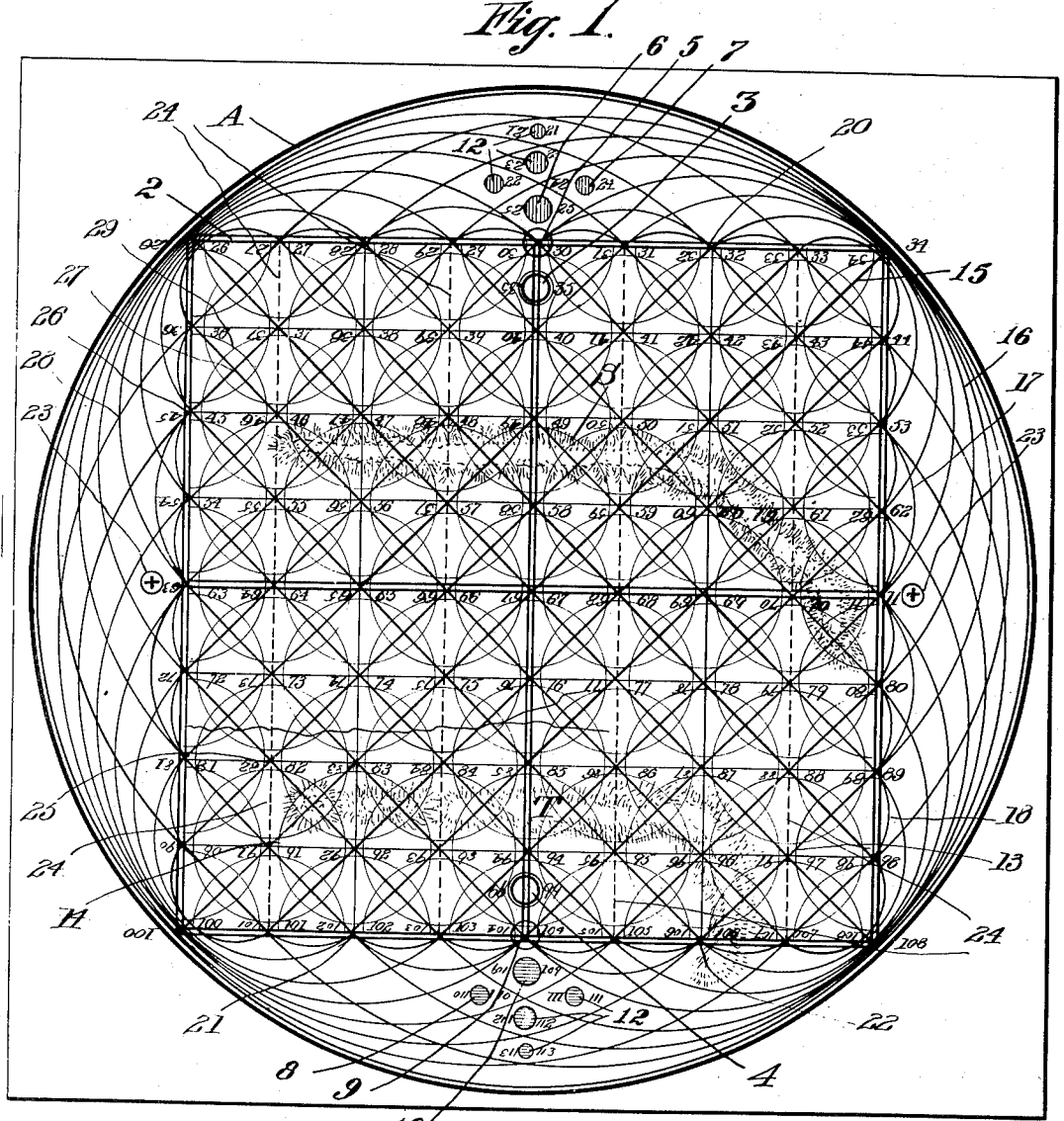

Fig. 1 is a plan view of the battlefield. Figs. 2, 3, 4, 5, 6 and 7 show the pieces representing the different bodies. Fig. 8 is a view similar to Fig. 1, with the circles and curves omitted, showing the positions of the pieces on the field, at the beginning of the game or battle.

The present map or board is a modified plan of the battlefield of Gettysburg. The disposition of the forces is similar to that of the two armies on the second and third days of the battle.

The pieces representing the forces are divided into two armies, the Federal or Union army being represented by the blue pieces, and the Confederate army by the red pieces. The opposing armies, at the beginning of the struggle, are drawn up on opposite sides of the field, supposed to be on two parallel ridges. The Confederate army is stationed upon and in the rear of Seminary Ridge, S, shown on the upper half of Fig. 1 and also in Fig. 8. The Union army is posted upon, and in the rear of Cemetery Ridge, T, shown on the lower half of Figs. 1 and 8.

The game is played by two persons, one of whom maneuvers the Union army, and the other the Confederate army. The object of each player is to destroy or capture the enemy's commander-in-chief, and such portions of his army as may be captured from time to time by the plays which the players are allowed to make, governed by the rules of the game. A system of military railroads, bicycle tracks, and automobile roads has been introduced, connecting all strategic points. As already stated, the railways are indicated in Figs. 1 and 8, by double or parallel lines. All the single straight lines, circles and curved lines, connected with the system, as shown in Fig. 1, represent bicycle tracks and automobile roads. In reality there is no difference between the bicycle tracks and the automobile roads. Those terms are used to show the rapidity with which the bodies of troops can be moved to distant parts of the field. All pieces engaged in the battle can use any railway, straight line, circle, or curved line, in their movements from post to post.

As shown in Figs. 1 and 8, there are 83 posts or points, formed by the intersection of straight lines, circles, and curves. These posts are all upon the boundaries of, or within the great square, formed by the lines representing the rectangular railway. They are supposed to be occupied by the bodies or pieces in action. The posts are indicated in Figs. 1 and 8, and in practice will bear numbers from 26 to 108 inclusive.

There are 12 other posts or stations situated, as seen in Figs. 1 and 8, outside the great square formed by the lines of the rectangular railway, and between the said railway and the circular railway. In Fig. 1 they are indicated by small circles, detached from the system of straight and curved lines. Six of these, 5, 6, 7, 12—12—12 in the rear of the Confederate army, are occupied by the Confederate reserves and by the commander of Confederate reserves, and commander of Confederate cavalry corps. They will be double-numbered with the numbers from 21 to 25, in the same manner as the posts within the rectangle. Six other of the posts referred to as 8, 9, 10, 12—12—12, are in the rear of the Union army, and in practice will be numbered as already described, with the numbers from 109 to 113. They are occupied, at the beginning of the action, by the Union reserves, and the commander of said reserves, and the commander of the Union cavalry corps. The remaining of the said posts as 23 are situated, one at the right side of the rectangular railway, and is marked with a cross within the circle, the other on the left side of the rectangular railway, also marked with a cross within the circle. The two pieces e Fig. 7 of the red cross corps, when not on duty, occupy these two stations.

Figure 3:

In Figs. 1 and 8, 3 shows the position, at beginning of the battle, of General Lee, commander-in-chief of the Confederate army, and 4 shows the position of General Meade, commander-in-chief of the Union army. 6 shows the position of General Pickett, commander of Confederate reserves. 7 indicates the position of General Stuart, commander of Lee's cavalry corps. 8 shows the position of General Pleasanton, commander of Meade's cavalry corps. 9 indicates the position of General Hancock commanding the Union center. 10 indicates the position of General Sedgwick, commander of Meade's reserves. The positions of all the corps and division commanders, and the location of their respective forces will be more definitely indicated when the disposition of forces for battle is given. The small circles marked 12 indicate the positions of the brigades of infantry and artillery held in reserve in either army, to be more definitely located later. 15 indicates the straight lines which cross the square formed by the rectangular railway, diagonal to the other straight lines, which are parallel with sides of the rectangular railway, as already described. 16 represents a system of curved lines connecting at each end with the diagonal straight lines (15), and converging into close proximity at the angles of the rectangular railway. They are called "outside curves," because outside the rectangle. 17 represents eight other outside curves, shorter than those indicated by 16. There are four of these on each side of the rectangular railway. They do not converge at the angles of the said railway. Each connects at both ends with the interior diagonal straight lines (15). There are 32 other outside-curves 18, shorter than those indicated by 17, eight on each side of the rectangular railway, and not converging at its four angles and each of these curves connects at both ends with the interior diagonal straight lines (15). All of the described "outside curves," designated by 16, 17 and 18, are supposed to be extended or prolonged into the interior diagonal straight lines, but not into the straight lines, running across the rectangle, parallel with its sides. The combinations of outside curves and interior diagonal straight lines, thus formed, are called "combination curves."

Figure 2:
Figure 4:
Figure 5:
Figure 6:
Figure 7:
Figure 8:
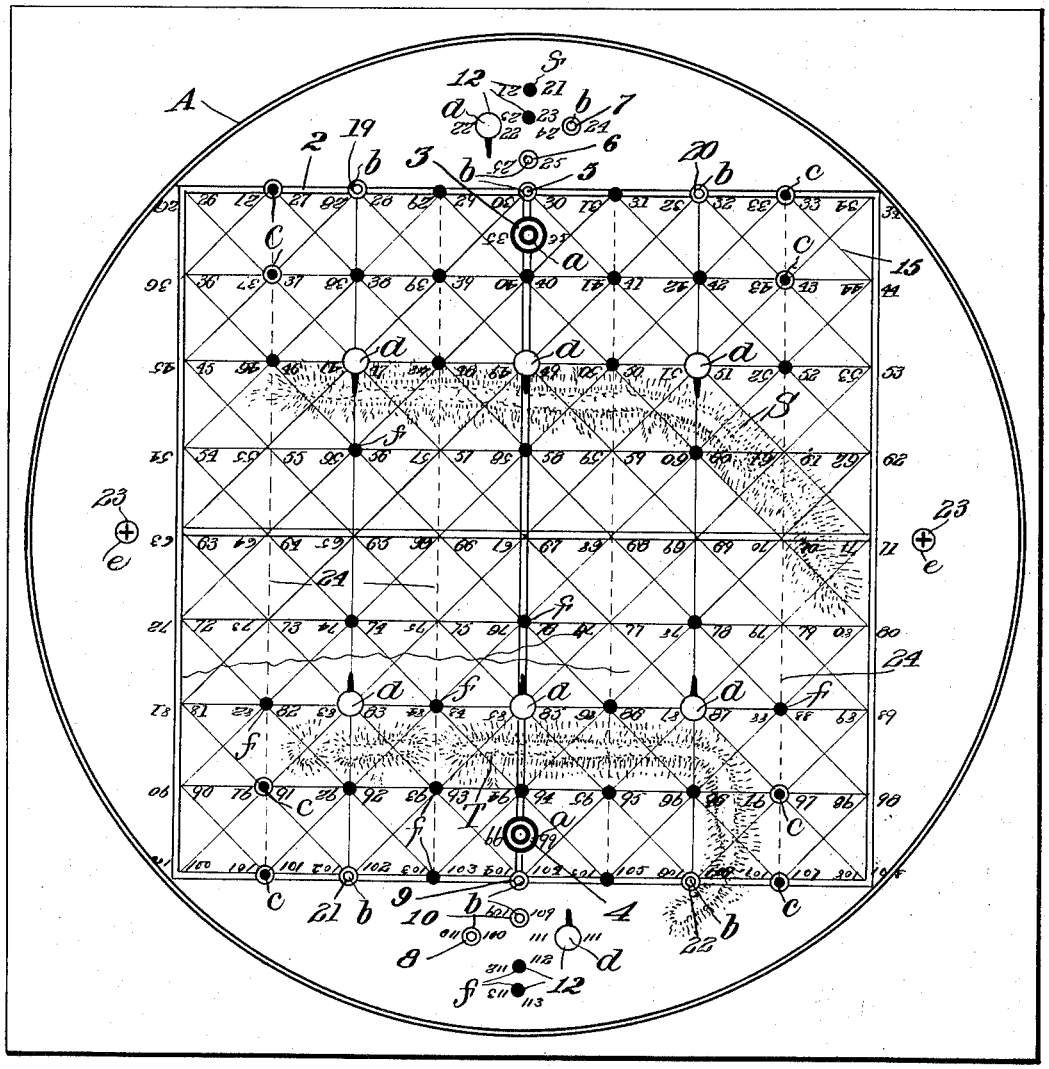

There are in each army four pieces, as d, Fig. 5, of artillery; four pieces as c, Fig. 6 of cavalry; sixteen pieces as f, Fig. 2, of infantry; five pieces as b, Fig. 3 of major generals or corps commanders; one piece as a, Fig. 4, for general in control; and one noncombatant piece as e, Fig. 7, in the red cross corps. Each cavalry piece c consists of two parts, to-wit; the mount (horse) and a removable rider which may be a piece of infantry. The several armies are each differently colored for their distinction; the horses c are all black; the corps commanders b may be marked with initials for identification.

A "play" or "turn" may be either a "shot," "charge" or "move," and each player must "play" alternately and may play his pieces by "moving" or shifting from post to post; by making a "shot" which means that the enemy's piece may be taken from the field when exposed in line of fire and not backed up or supported; and by "charging" by which is meant a jump or capture. A piece is not "moved" when "firing."

Moves, shots, and charges, begun on outside curves, may be continued on the interior diagonal straight lines, and vice versa. Moves, begun on outside curves, may be continued on interior straight lines parallel with the sides of the rectangle, and vice versa, but shots and charges cannot be thus continued. All moves, shots and charges follow the railroads, curves, outside curves, straight lines, and combination curves, from post to post, and cannot change direction or take a different road between two posts. All changes of direction are made at the numbered posts. There are many crossings of curves and straight lines not known as posts. They are never occupied by pieces in action, no moves change direction there, and no attention is paid to them. Pieces are said to be in action when not held in reserve in the reserve stations, outside the rectangular railway, in the rear of each army. Pieces in action never occupy the two stations marked with a cross, and never use the reserve stations. They are halted at no posts except those within the great square inclosed by the rectangular railway. Shots from artillery may have straight or curvilinear courses; that is, they follow the straight lines or the curves and circles in order to represent the wide spread destruction caused by modern high power explosives, shots from rifles of infantry or cavalry are confined to straight lines. The two red cross corps pieces e are non-combatants. Their work, on the field, is to trace the course of shots by artillery, infantry or cavalry; and they are supposed to move the dead and care for the wounded. After a shot is finished, they retire to their stations.

In Figs. 1 and 8, the four dotted lines 24 running squarely across the space inclosed by the rectangular railway, parallel with the sides of said railway, mark the boundaries of the three corps in Lee's army, and the three divisions, right, left, and center, in Meade's army. The corps of the Union army were smaller than those of the Confederate army but there were twice as many of them, therefore, to avoid having more pieces representing generals in Meade's army, than in Lee's, Lee's army is divided into divisions, (the right, left and center) each containing two corps. The Union right division will be commanded by a piece b marked W. S. for Generals Wadsworth and Slocum. The left will be commanded by a piece b marked S. S. for Generals Sykes and Sickles; and the center will be commanded by a piece b marked H. H. for Hancock and Howard. Opposed to these three divisions on the Confederate sides between the same boundary lines, are the three corps of Lee's army. The right will be commanded by a piece b marked L. for General Longstreet, the center will be commanded by a piece b marked H. for General Hill and the left by a piece b marked E. for General Ewell. The territory of each corps or division extends entirely across the space inclosed by the rectangular railway. When a general commanding a corps or division is shot or captured, his whole command, (which includes all the pieces within this territory, excepting other generals' cavalry, and the enemy's pieces), must surrender and be removed from the board. Pieces on a boundary line between two corps or division belong to both. When either of the two surrenders said pieces must surrender with it. The territory of each cavalry corps extends over the entire field. When a general commanding a cavalry corps is shot or captured, all his cavalry pieces no matter where located, must surrender, and be removed from the board. When the commander-in-chief of either army is shot or captured his whole army must surrender. When either Lee or Meade has lost his whole army, he has but one more play remaining, in which he is required to capture the enemy's commander-in-chief. Failing to do this, he must surrender.

Some of the powers and liabilities of the pieces will now be given. The pieces take other pieces either by firing or by charging. The charging pieces include all the generals, the infantry, and the cavalry. The firing pieces are the artillery, infantry, and the cavalry.

The red cross pieces are non-combatants. Their duty on the field is to trace the course of all shots, as will be explained later, while the firing piece remains at its post. They are supposed to remove the dead and care for the wounded. The shot being finished, they retire to their post.

Every piece on the board, including Lee and Meade, when unsupported, may be captured, by charge of any hostile charging piece.

Every piece on the board, including Lee and Meade, when unsupported, may be shot by artillery. Artillery can be shot only by artillery. Neither artillery nor any of the generals, including Lee and Meade can be shot by infantry or cavalry. Infantry and cavalry can shoot none but the infantry and cavalry.

The rules of the game will now be set forth and explained.

The game is for two players. One player maneuvers the Confederate army, or the red pieces. The other maneuvers the Union army, or the blue pieces. The players sit on opposite sides of the board, each in the rear of the army he is supposed to command. The object of each player is to shoot or capture his adversary's commander-in-chief and to destroy his army. When either Lee or Meade is taken, his army must surrender. When either Lee or Meade has lost his whole army, he has but one move remaining, in which he is required to capture his opponent's commander-in-chief. Failing to do this, he must surrender.

*First move.*—In the first game Lee attacks. He may use any movable piece in his army. Meade moves next, and the moves continue alternately. In subsequent games, first move must alternate. The players use but one piece at each play, except in posting reserve. A player may use any piece in his army that is in action and movable. All pieces are in action, unless captured, or held in reserve at the reserve posts, in the rear of each army (see Figs. 1 and 8). Pieces are playable, unless surrounded by the enemy's pieces, or by friendly pieces so they cannot be got out to a vacant post. Every playable piece can be moved in any direction, to any vacant numbered post, provided the way is not barred or held, at one or more posts, by the enemy's pieces. All moves, shots and charges follow the railways, straight lines, curves, outside curves, and combination curves, from post to post; and cannot change direction or take a different road between two posts. All changes of direction are made at the posts or points. When not traveling by railroad, all pieces, excepting Lee and Meade, may, at the player's option, move 1 point, or 2 points. Lee and Meade, when not traveling by railroad may move 1 point, 2 points, or 3 points, at their option. In reckoning distances, a point is the distance between two posts, following a railroad, straight line, curve, outside curves, or combination curves, and the post of beginning is not counted.

From the foregoing it is apparent that the forces are mobile to almost any required degree. Every piece, holding a post on a railroad, may be moved by railroad as far as the player chooses; and may be halted at any vacant post, on a railroad, provided the way to said post is not barred or held at one or more posts by the enemy's pieces. A piece, in order to travel by railway, must be on a railway when the play is begun, and must be halted, at a vacant post, on a railway. This must not be construed to prevent 2-point and 3-point moves from being made, partly on a railway, and partly off. Railroads may be crossed by 2-point and 3-point moves. Shots and charges may follow railroads, the same as they follow other roads. Plays on railroads are made through vacant posts, or through the player's own lines; that is, his own pieces holding posts on a railroad do not bar travel through those posts; but a piece cannot move on a railroad, or on any other road through a post held by the enemy. He may also, on any other road, move a piece through a post held by one of his own pieces by a 2-point, or a 3-point move, provided he can halt the piece at a vacant post. No two pieces can hold the same post. Pieces, unsupported, are liable to be shot by the enemy, or captured in a charge. A supported piece is one backed by another piece, either friendly or hostile, at the next (contiguous) post, on the same railroad, straight line, curve, circle, outside curve, or combination curve. In the game of checkers, the support for a piece must be on the next or contiguous square. In this game the principle is the same but the supporting piece must be contiguous, on a railroad, or on any line curved or straight. Notice also, that a supporting piece may be either friendly or hostile to the piece supported. Pieces are taken from the enemy either by charging, by a shot, or by surrender of the corps or division, when their corps or division commander is shot or captured. Unsupported pieces are taken on a charge, when the charging piece leaps over them into a vacant post, contiguous to the piece taken, as in the game of checkers or draughts. All captured pieces must be removed from the board as fast as taken, so the field may clear for other charges or shots. There is no exchange of prisoners.

In captures by charge, the charging piece must be contiguous to the piece taken, (with apparent exceptions following); and the charging piece, the piece taken, and the vacant post, into which the charging piece leaps, must all be on the same railroad, straight line, curve, circle, outside curve, or combination curve. The cavalry and the generals are not required to be contiguous to an unsupported piece, to start a charge. The cavalry at their option may move 1 point, the corps and division commander may at their option, move 1 or 2 points, and Lee and Meade may at their option, move 1, 2, or 3 points, to reach an unsupported piece, and start a charge. This will be explained elsewhere. A charging piece cannot leap around an angle to capture. A firing piece cannot shoot around an angle, but both charging pieces and artillery after taking a piece, may change direction, at any angle, to take another, and must continue the process as long as pieces can be taken. This does not prevent shots and charges from being made around curves, circles, outside curves, and combination curves. The junction of the straight line and curve, in a combination curve, is not regarded as an angle. For purpose of shots and charges, combination curves are regarded as curves. Pieces are taken by shooting in same way, as by charging, excepting that the firing piece does not change its position; "don't go there to capture," as some express it. The firing piece remains at its post, while a piece from the red cross corps is sent out to trace the course of the shot, by leaping over the unsupported pieces into the vacant posts, the same as a charging piece would do. The shot being finished, the red cross retire to their station. All charges and shots must be continued to the end, where no more pieces can be taken, regardless of the consequences to the attacking party. Shots from infantry and cavalry are made only on straight lines, and on straight railroads, and cannot zig-zag or change direction by leaving the straight line or straight railroad, the shot was started on. Shots from artillery after taking one piece, may change direction for the capture of others, on all railroads, straight lines, curves, outside curves, and combination curves, and must be continued to the end, where no more pieces can be taken. When, during progress of a shot, or of a charge, a piece is reached where capture or shots can be made on two or more different roads, the player takes his choice of routes, but can use only one road. Shots are either short range, or long-range. Short range shots are made only by artillery, and are started on an unsupported piece contiguous (at next post) to the firing piece. They must be continued to the end, as above described. Short-range shots can not be made by infantry or cavalry, because an unsupported hostile piece, contiguous to infantry or cavalry, must be charged. Long-range firing is done either by artillery, infantry, or cavalry, at a distance of more than one point to the first piece struck by the shot, that is the shots are not started on a contiguous piece. The first piece struck must be on the same straight line as the firing piece, and the way must be clear the whole distance from the firing piece to the first piece shot. Long range shots by infantry and cavalry must be continued on same straight line they are started on, as long as unsupported pieces can be found, but they must not change direction and leave the said straight line. Long-range shots by artillery are started on a straight line, and the first piece taken must be unsupported on the same straight line; that is, the vacant contiguous post, into which the red cross piece leaps, must be on the same straight line the shot was started on. The shot must be continued to the end on the same straight line, or on other straight lines, and on curves, railroad circles, outside curves, and combination curves, changing direction wherever necessary, but must follow only one route. After any firing piece has completed a shot, if there be opportunity, shots must be taken in other directions, or in the same direction, as long as unsupported pieces can be found in range; all the shots being made from the same post, and at the one play. When, after completion of a shot or a charge, a cavalry corps, or any other corps, or division, surrenders, and is removed from the field, thereby leaving unsupported pieces in range of the firing piece, or contiguous to the charging piece, the firing must be continued at same play, as long as unsupported pieces can be found in range.

If the play be a charge it must be renewed and continued to the end, where no more pieces can be taken. Sometimes another corps or division surrenders, after completion of the renewed charge, or shot, giving another opportunity to renew and continue the shot or the charge. The process of firing, or of charging, in such cases, must be continued as long as shots or charges can be made. Firing pieces must, after moving, wait until their next play, in order to shoot. Infantry, after moving to reach an unsupported piece, must wait until next play in order to charge. Cavalry must charge a contiguous unsupported piece. They may, at their option, move one point to reach an unsupported piece, and start a charge at same play. All the generals, excepting Lee and Meade, must charge a contiguous unsupported piece. They may, at their option, move 1 point, or 2 points to reach an unsupported piece and start a charge, at same play. Lee and Meade never fire, and they may, at all times, decline to charge a contiguous unsupported piece; they may at their option, move 1 point, 2 points or 3 points to reach an unsupported piece and start a charge, at same play. After a charge has been started, no piece can be taken unless contiguous to the charging piece. Infantry move, shoot, and charge, in all directions, using straight lines and straight railroads only. They move on the circular railway, but do not charge and fire on it. Cavalry move and charge in all directions, on all railroads, straight lines, curves, outside curves, and combination curves. They fire only on straight lines, and on straight railroads, same as infantry. All the generals, including Lee and Meade, move and charge in all directions, on all railroads, straight lines, curves, circles, outside curves and combination curves. They never fire. When a player has opportunity to fire or charge, he is compelled to fire or charge with exceptions following: Cavalry and all generals may decline to charge when the unsupported piece is not contiguous. Lee and Meade may at all times decline to charge even if the unsupported piece be contiguous. When a player has more than one opportunity to fire or charge, he takes his choice of opportunities, but can use but one piece at each play. When there are opportunities to both shoot and charge, a charge must always be made in preference to a shot unless all the charges can be declined as already explained. If the charges may all be declined, the player has option to either shoot or charge, but he must do either one or the other. Since all pieces may move through posts held by friendly pieces, and since cavalry may move one point and start a charge, they may move one point to a friendly piece contiguous to an unsupported hostile piece, and start a charge. All the generals, excepting Lee and Meade, may move one point or two points to a post held by a friendly piece contiguous to an unsupported hostile piece, and start a charge. Lee and Meade may move one point, two points, or three points to a post held by a friendly piece, contiguous to an unsupported hostile piece, and start a charge. The moves described may be wholly or in part through posts held by friendly pieces. The above must not be construed to permit a charging piece to capture another piece without changing its post; that is, by moving to another post to start the charge, and taking a piece by leaping back to the post it started from. A charging piece may halt at the post it started from, provided it make a circuit, taking more than one piece; and it may continue the charge in some other direction if there be opportunity. During progress of a shot it is permitted to shoot back to the firing piece because in this case the firing piece is not compelled to support the enemy's piece. The shot may be continued if there be opportunity.

When a general commanding one of the three corps in Lee's army or one of the three divisions in Meade's army, is shot or captured, all pieces belonging to his corps or division must surrender, and be removed from the board. The surrender does not include cavalry, other generals, or the enemy's pieces, within the boundaries of his territory. Pieces on a boundary line between two corps or divisions belong to both. When either corps or division surrenders, they must surrender with it.

When a general commanding a cavalry corps is shot or captured, all his cavalry must surrender, no matter where located. The surrender includes none but cavalry. A player who has lost his cavalry general cannot give captured horses to infantry riders. He cannot have a cavalry corps without a cavalry general. Generals, and all other pieces, not held in reserve, may move from their own corps or division into any other corps or division; and all thus moved, excepting cavalry and generals, belong to the corps or division they have moved into. A corps commander or a division commander, who has moved out of his corps or division, retains command of his own corps or division.

After a corps or division has surrendered, its territory may again be occupied by other pieces, belonging to the player who sustained the loss; all of which, excepting cavalry and generals, are under personal command of the commander-in-chief. Vertical lines at the sides of the rectangle of Fig. 1 and extending on one side from the number 26 to 100 and on the opposite side from 34 to 108, while a part of the railway system, are not a part of the territory of any corps or division, excepting the territory of the cavalry corps. All pieces on these two lines excepting cavalry and generals, are under personal command of pieces a—a representative of Lee and Meade. When a corps, division, or cavalry corps, have all been shot, or captured, excepting their commander, he is not required to surrender. He remains under fire, and the commander-in-chief may, at his option, send other pieces to replace those missing in action. When, during the progress of a shot, or of a charge, a corps commander, or a division commander, is shot or captured, his corps, division, or cavalry corps, does not surrender till after the shot or charge has been continued to the end, where no more pieces can be taken. When a general commanding reserves is shot or captured, the reserves do not surrender, because they are attached to other corps or divisions, or they may be all, or a part, under personal command of the commander-in-chief, as already explained.

Cavalry are taken by shooting or capturing the riders, or by surrender of their corps. If an infantryman shoot a cavalryman, or take one in a charge, he takes the horse for a mount, and becomes a cavalryman, and belongs to the cavalry corps. If he takes more than one in the charge or shot, he claims one horse for a mount, and the other horses must be given, as mounts, to any of his infantry the player making the capture selects. When cavalry are shot or captured by any piece besides infantry, or are taken by surrender of cavalry corps, the player making the capture, must give the horses for mounts to any of his infantry he may select.

When, and how, the reserves are brought into action, will now be explained.

All the pieces, including the commander of reserves and commander of cavalry, stationed in the five small detached circles, in the rear of each army, constitute the reserves of the army they are in the rear of. The said reserves of either army take no part in the battle, till after the army to which they belong has lost a corps or division. At the next play, after the loss of a corps or division, the player sustaining said loss must bring all his reserves into action, and must station them at any vacant posts he may select, within his lines, held at the beginning of the battle; that is at vacant posts which were held by his pieces at the beginning of the action; but any vacant post on the parallel line closest the railway in the middle of the field on Lee's side (Lee's skirmish line) may be held by Lee's reserve; and any vacant post on the closest parallel line to the railway on Meade's side (Meade's skirmish line), may be held by Meade's reserves. The cavalry may be used before the reserves come into action; but the cavalry commanders cannot be used till brought into action with the reserves.

Posting his reserves does not count for the player's play; but, after disposing his reserves, before the enemy moves, he must play. He may use any movable piece in his reinforced army. The play may be a charge, shot, or movement of a piece, subject, of course, to rules already given. After one player has posted his reserves his adversary cannot bring his reserves into action till he also has lost a corps or division.

Then he must post his reserves, and play, as already described. When a player neglects to shoot or charge, and his adversary has moved, both plays must stand. Plays of all kinds, not in violation of rules of the game, must stand, unless the adversary concedes permission to change; mistakes of all kinds, in violation of rules, may be corrected before the enemy plays, and must be corrected at the opponent's request. After the enemy plays the mistakes cannot be corrected.

Having thus described my invention, what I claim and desire to secure by Letters-Patent is—

1. A map having an outer circle and lines arranged to form a rectangle contained within the circle, said circle and rectangle indicating railways; lines arranged at right angles to each other and forming substantially a Greek cross, and indicating an interior railway; a series of curved lines in the circle exterior to the said rectangle; and straight lines in the space inclosed by the lines forming the rectangle and merging into said curved lines.

2. A battle map having an exterior circle, an outer rectangle and interior rectangularly arranged lines crossing each other at right angles and at angles at 45° with the sides of the outer rectangle, and curved lines outside of the outer rectangle and forming extensions with the straight lines, said curved lines converging into close proximity at each of the angles of the outer rectangle and curved lines exterior to the rectangle not converging at the angles thereof forming extensions at both ends of said curves with the straight lines within the rectangle.

3. A battle map including an exterior circle, a rectangle within the same, and forming double lines to indicate railways, other lines extending diagonally across the rectangle and at right angles to each other, curved lines outside of the rectangle forming extensions of the diagonal lines and connecting the same through the angles of the rectangle, other curved lines outside of the rectangle and connecting with the diagonal lines, lines interior to the rectangle and parallel with the sides thereof, and circles intersecting said last mentioned lines and each other, substantially as described.

4. A battle map consisting of a circle and interior rectangular double lines indicating railways, parallel and diagonal intersecting lines and connecting curved lines, stations indicating the positions of the commanders-in-chief and of the commanders of corps or divisions, stations indicating the positions of the pieces representing artillery, infantry, cavalry and hospital corps, and pieces marked to indicate the generals or hospital corps occupying each station, said pieces being movable upon the lines of the map.

5. A battle map consisting of an exterior circle, and an interior rectangle, lines representing an interior cross railway, lines crossing the interior rectangle, and crossing each other at right angles and at angles of 45 degress with the sides of the rectangle, and curves exterior to the rectangle and forming extensions of the said interior diagonal straight lines, said curves converging into close proximity at each of the angles of the rectangle, and curves exterior to the rectangle, not converging at the angles of the said rectangle, forming extensions at both ends of the said curves with the said diagonal straight lines within the rectangle, straight lines crossing the interior of the rectangle parallel with its sides, and crossing each other at right angles and at an angle of 45 degrees with the said interior diagonal straight lines, dotted straight lines, interior to the rectangle and parallel with its sides, and parallel with each other, said dotted straight lines marking the boundaries of the corps of two contending armies, as explained in the disclosure, and circles interior to the rectangle, intersecting each other, and intersecting the said diagonal lines and the other straight lines interior to the rectangle, near the intersections of the said interior straight lines, and stations interior to the rectangle and stations on the lines of the rectangle, showing the locations of pieces representing the units of two contending armies, and other stations exterior to the rectangle showing the locations of pieces representing red cross corps and the reserve forces of the said armies, pieces representing brigades of infantry, pieces representing generals commanding corps and divisions, pieces representing commanders-in-chief, pieces representing artillery mounted in turrets, pieces representing cavalry, each of which consists of two detachable parts, and pieces representing the red cross corps.

In testimony whereof I have hereunto set my hand in the presence of two subscribing witnesses.

GEORGE W. WALLACE.

Witnesses:
 Geo. H. Strong,
 Charles Edelman.